United States Patent
Lacampagne et al.

(10) Patent No.: US 11,721,946 B2
(45) Date of Patent: Aug. 8, 2023

(54) OPTICAL SYSTEM ELEMENT, FOR RECEIVING A PRESSURISED FUNCTIONAL FLUID

(71) Applicant: COMMISSARIAT A L'ENERGIE ATOMIQUE ET AUX ENERGIES ALTERNATIVES, Paris (FR)

(72) Inventors: Lionel Lacampagne, Gujan-Mestras (FR); Christian Chappuis, Andernos-les-Bains (FR); Jerome Neauport, Bordeaux (FR); Sebastien Vermersch, La Teste-de-Buch (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 271 days.

(21) Appl. No.: 16/966,952

(22) PCT Filed: Feb. 4, 2019

(86) PCT No.: PCT/FR2019/050237
§ 371 (c)(1),
(2) Date: Aug. 3, 2020

(87) PCT Pub. No.: WO2019/150057
PCT Pub. Date: Aug. 8, 2019

(65) Prior Publication Data
US 2021/0036478 A1 Feb. 4, 2021

(30) Foreign Application Priority Data
Feb. 5, 2018 (FR) ...................................... 18 50946

(51) Int. Cl.
*H01S 3/04* (2006.01)
*H01S 3/02* (2006.01)
(Continued)

(52) U.S. Cl.
CPC ............ *H01S 3/0407* (2013.01); *H01S 3/022* (2013.01); *H01S 3/027* (2013.01); *H01S 3/0401* (2013.01);
(Continued)

(58) Field of Classification Search
CPC .... H01S 3/0404; H01S 3/0407; H01S 3/0401; H01S 3/042; H01S 3/027
See application file for complete search history.

(56) References Cited

U.S. PATENT DOCUMENTS 3,361,989 A 1/1968 Sirons
3,663,891 A 5/1972 Kocher et al.
(Continued)

FOREIGN PATENT DOCUMENTS

CN 107017544 A * 8/2017 ............... H01S 3/03
CN 107204561 A * 9/2017 ........... H01S 3/0346
(Continued)

OTHER PUBLICATIONS

International Search Report dated Jun. 7, 2019 in PCT/FR2019/050237 filed on Feb. 4, 2019, 3 pages.
(Continued)

*Primary Examiner* — Joshua King
(74) *Attorney, Agent, or Firm* — Oblon, McClelland, Maier & Neustadt, L.L.P.

(57) ABSTRACT

An optical system element includes a first enclosure designed for receiving in circulation a functional fluid and at least one inlet and/or outlet window located on the first enclosure and through which a light beam can pass. The inlet and/or outlet window includes two viewports which delimit a spacer cavity adjacent to the first enclosure. The spacer cavity is designed to receive a second fluid with a predetermined optical index and is equipped with a device for adjusting the pressure therein. Degradation of a beam during
(Continued)

its passage through the inlet and/or outlet window can be limited by careful selection of the optical index of the second fluid and the pressure in the spacer cavity.

18 Claims, 4 Drawing Sheets

(51) Int. Cl.
| | |
|---|---|
| *H01S 3/042* | (2006.01) |
| *H01S 3/06* | (2006.01) |
| *H01S 3/213* | (2006.01) |
| *H01S 3/23* | (2006.01) |
| *H01S 3/094* | (2006.01) |
| *H01S 3/091* | (2006.01) |

(52) U.S. Cl.
CPC ............ *H01S 3/042* (2013.01); *H01S 3/0404* (2013.01); *H01S 3/0602* (2013.01); *H01S 3/213* (2013.01); *H01S 3/2316* (2013.01); *H01S 3/091* (2013.01); *H01S 3/094* (2013.01)

(56) References Cited

U.S. PATENT DOCUMENTS

| | | | |
|---|---|---|---|
| 3,731,225 A | 5/1973 | Wild et al. | |
| 3,810,044 A * | 5/1974 | Woodbury | H01S 3/042 372/33 |
| 4,289,379 A * | 9/1981 | Michelet | G02B 26/0816 359/666 |
| 4,326,589 A * | 4/1982 | Ballman | A62C 35/60 169/5 |
| 4,672,617 A | 6/1987 | Hansen | |
| 4,742,524 A * | 5/1988 | Muller | H01S 3/102 372/20 |
| 5,237,583 A * | 8/1993 | Brimacombe | H01S 3/086 372/99 |
| 5,363,391 A * | 11/1994 | Matthews | H01S 3/0401 372/66 |
| 5,416,791 A * | 5/1995 | Otani | H01S 3/0346 372/65 |
| 5,636,239 A * | 6/1997 | Bruesselbach | H01S 3/0941 372/70 |
| 5,825,801 A * | 10/1998 | Nishida | B23K 26/0643 372/19 |
| 6,069,909 A * | 5/2000 | Miller | H01S 3/034 372/59 |
| 6,327,290 B1 | 12/2001 | Govorkov et al. | |
| 6,426,966 B1 * | 7/2002 | Basting | H01S 3/08004 372/100 |
| 6,937,629 B2 | 8/2005 | Perry et al. | |
| 9,209,598 B1 * | 12/2015 | Reagan | H01S 3/042 |
| 2001/0004368 A1 * | 6/2001 | Akagi | H01S 3/0941 372/35 |
| 2002/0034207 A1 | 3/2002 | Govorkov et al. | |
| 2002/0041614 A1 | 4/2002 | Govorkov et al. | |
| 2003/0161364 A1 * | 8/2003 | Perry | H01S 3/025 372/39 |
| 2003/0161365 A1 * | 8/2003 | Perry | H01S 3/20 372/39 |
| 2004/0196883 A1 * | 10/2004 | Rieger | H01S 3/0941 372/75 |
| 2005/0271098 A1 | 12/2005 | Perry et al. | |
| 2006/0083276 A1 * | 4/2006 | Brown | H01S 3/042 372/36 |
| 2006/0088067 A1 * | 4/2006 | Vetrovec | G02F 1/0102 372/21 |
| 2006/0262433 A1 * | 11/2006 | Hendriks | H01S 3/08059 359/846 |
| 2006/0274797 A1 * | 12/2006 | Myers | H01L 33/648 372/36 |
| 2007/0002921 A1 | 1/2007 | Perry et al. | |
| 2011/0097045 A1 * | 4/2011 | Benabid | G02B 6/02328 65/393 |
| 2014/0269794 A1 * | 9/2014 | Murray | H01S 3/027 372/33 |
| 2015/0194784 A1 * | 7/2015 | Kwon | H01S 3/109 372/22 |
| 2016/0248214 A1 | 8/2016 | Kurosu et al. | |
| 2017/0330636 A1 * | 11/2017 | Sekine | G21B 1/23 |
| 2018/0026414 A1 | 1/2018 | Kurosu et al. | |
| 2019/0081451 A1 | 3/2019 | Kurosu et al. | |

FOREIGN PATENT DOCUMENTS

| | | | | |
|---|---|---|---|---|
| CN | 108418083 A | * | 8/2018 | |
| CN | 108505037 A | * | 9/2018 | ............ C23C 24/10 |
| DE | 3631941 A1 | * | 4/1987 | |
| DE | 3720185 A1 | * | 1/1989 | |
| DE | 3915151 A1 | | 11/1990 | |
| DE | 202006010316 U1 | * | 10/2006 | ............ H01S 3/034 |
| EP | 1788672 A2 | * | 5/2007 | ............ H01S 3/025 |
| FR | 2150264 A2 | * | 4/1973 | |
| FR | 3095556 A1 | * | 10/2020 | ............ H01S 3/025 |
| GB | 1271349 A | * | 4/1972 | |
| JP | 54060590 A | * | 5/1979 | |
| JP | 55024475 A | * | 2/1980 | |
| JP | 56112780 A | * | 9/1981 | |
| JP | 61203689 A | * | 9/1986 | ............ H01S 3/0346 |
| JP | 1-181486 A | | 7/1989 | |
| JP | 03116794 A | * | 5/1991 | ............ H01S 3/042 |
| JP | 2505225 B2 | * | 6/1996 | |
| WO | WO-2007110342 A1 | * | 10/2007 | ............ H01S 3/042 |
| WO | WO-2021064964 A1 | * | 4/2021 | |

OTHER PUBLICATIONS

Preliminary French Search Report dated Dec. 17, 2018 in French Application No. 18 50946 filed on Feb. 5, 2019.
Okada et al., "Liquid-cooled ceramic Nd:YAG split-disk amplifier for high-average-power laser", Optics Communications, 2006, vol. 266, No. 1, pp. 274-279.

* cited by examiner

OPTICAL SYSTEM ELEMENT, FOR RECEIVING A PRESSURISED FUNCTIONAL FLUID

TECHNICAL FIELD

The invention relates to an element of an optical system, the element including an enclosure for receiving in circulation a functional fluid, and adapted to allow a light beam to pass into and/or out of the enclosure.

The invention more particularly, but in non-limiting way, relates to the field of optical amplifiers.

STATE OF PRIOR ART

In prior art, an element including an enclosure for receiving in circulation a refrigerant, for efficiently cooling a solid amplifying medium disposed in the enclosure, is for example known. The enclosure is provided with at least one inlet and/or outlet window, for allowing a laser beam generated, in operation, by the solid amplifying medium, to pass.

Document U.S. Pat. No. 6,937,629 describes an optical system including an example of such an element. An enclosure receives a series of thin plates, disposed one after the other along a longitudinal axis, and each forming a solid amplifying medium.

The enclosure also includes an inlet opening, and an outlet opening, enabling a refrigerant to flow through the enclosure. In operation, the refrigerant flows in a cooling circuit by passing through the enclosure, with a flow rate enabling the thin plates to be efficiently cooled.

The optical system further includes pumping diodes, located outside the enclosure, and for optically pumping the thin plates. The enclosure is disposed between two reflecting mirrors, which define together an optical cavity resonating at the wavelength of a laser signal emitted by the thin plates, in operation.

For the laser signal to be able to travel back and forth in the resonant optical cavity, the enclosure has two inlet and/or outlet windows, formed on two opposite faces of the cavity. Each of these windows consists of a viewport, or window, transparent at the wavelength of the laser signal.

In operation, the refrigerant passing through the enclosure exerts a pressure force on these viewports, causing a slight mechanical deformation of the latter, and thus a wave front deformation on the laser signal flowing in the optical cavity.

In the article "*Liquid-cooled ceramic Nd:YAG split-disk amplifier for high-average-power laser*", HajimeOkada & al., Volume 266, Issue 1, Optics Communications, 1 Oct. 2006, Pages 274-279, the authors provide an optical amplifier provided with a phase conjugation mirror, to compensate for wave front defects related to dipping the amplifying medium in a flowing refrigerant. The use of a phase conjugation mirror however remains a complex expensive solution to implement.

One purpose of the present invention is to provide an element of an optical system, the element including an enclosure adapted to receive in circulation a functional fluid, and enabling a wave front deformation to be limited on a light beam passing into and/or out of said enclosure.

One purpose of the present invention is also that the solution provided is simple and inexpensive.

DISCLOSURE OF THE INVENTION

This purpose is achieved with an element of an optical system including:

a first enclosure, for receiving in circulation (or flowingly receive) a first fluid, called an functional fluid; and at least one inlet and/or outlet window, located on the first enclosure, and capable of allowing a light beam to pass into and/or out of the first enclosure.

According to the invention, the inlet and/or outlet window includes two viewports which laterally delimit a so-called spacer cavity, adjacent to the first enclosure.

The spacer cavity is for receiving a second fluid, having a predetermined optical index, and is provided with a pressure adjusting device therewithin.

In operation, the first enclosure receives the flowing functional fluid. The inlet and/or outlet window then separates the functional fluid and an ambient medium, each having respective optical indices different from each other. The functional fluid, flowing in the first enclosure, exerts on the inlet and/or outlet window, a pressure force likely to deform it. This deformation can generate optical aberrations on the light beam which passes through said inlet and/or outlet window.

The idea underlying the invention is to make use of the property according to which aberrations brought about by the deformation of a transparent plate are lesser, when the plate separates two media with substantially equal optical indices.

The invention thus provides that the inlet and/or outlet window does not comprise a single viewport, but two viewports separated by a gap called a spacer cavity.

In operation, the spacer cavity receives the second fluid, having a predetermined optical index, and is provided with a pressure adjusting device therewithin. It is possible to choose the second fluid, such that it has an optical index substantially equal to one of the functional fluid and the ambient medium, and to adjust pressure in the spacer cavity such that it is substantially equal to the pressure of the other of the functional fluid in the first cavity and the ambient medium.

In other words, the invention enables an inlet and/or outlet window to be made, in which:

a first viewport separates two media at two pressures different from each other, but the optical indices of which are substantially equal; and a second viewport separates two media the optical indices of which are different from each other, but having substantially the same pressure.

The first viewport is deformed by the pressure difference between both media it separates. However, since both media have substantially equal optical indices, the wave front deformation associated with the first viewport deformation is lesser, in comparison with a single viewport according to prior art.

The second viewport separates two media the optical indices of which are different from each other. However, since both media have substantially the same pressure, the second viewport is hardly deformed at all. Consequently, the wave front deformation associated with the second viewport deformation is lesser, in comparison with a single viewport according to prior art.

Finally, the sum of the front wave deformations brought about by both viewports according to the invention is smaller than the wave front deformation brought about by a single viewport according to prior art.

In other words, the inlet and/or outlet window of the element according to the invention has, in operation, optical aberrations smaller than those of a single-viewport inlet and/or outlet window as described in prior art.

A wave front deformation can thus be limited on a light beam passing through the inlet and/or outlet window, although the functional fluid confined in the first enclosure exerts a pressure force on this window.

This reduction in optical aberrations is particularly simply achieved, without resorting to adaptive optics-type complex technologies, by means of simple pressure balancing operations and a choice of adapted optical indices.

The invention also provides real time adjustment to current pressure conditions in the first enclosure, by adjusting pressure in real time in the spacer cavity by means of the pressure adjusting device.

The invention is particularly advantageous in the field of high energy and high mean power laser amplification systems, in particular clocked type laser amplification systems.

Anyway, the invention has a particular interest when implemented in an optical system having a large pupil size, for example greater than or equal to 100 nm. Indeed, optical aberrations brought about by an optical system cause a wave front deformation the peak-valley amplitude of which increases with an increasing pupil size of the system. Therefore, it is all the more relevant to limit these aberrations, when the pupil size is large.

Preferably, the light beam is a laser signal, generated and/or amplified within the first enclosure. It can be a monochromatic light beam, having an emission peak with a full width at half-maximum smaller than or equal to 50 nm, and more preferentially smaller than or equal to 10 nm or even smaller than or equal to 1 nm. The element according to the invention then more particularly forms an element of an optical amplifier.

Preferably:
the second fluid has an optical index substantially equal to that of one of the functional fluid and an ambient medium surrounding said element, within plus or minus 10%; and
the pressure adjusting device is adapted for the pressure within the spacer cavity to be substantially equal to the pressure of the other of the functional fluid in the first enclosure and the ambient medium, within plus or minus 10%.

Advantageously, a mean thickness of the viewport located on the side of the first enclosure is smaller than a mean thickness of the viewport located on the side opposite to the first enclosure.

According to a first embodiment:
the second fluid has an optical index substantially equal to that of the ambient medium, within plus or minus 10%; and
the pressure adjusting device is adapted for the pressure within the spacer cavity to be substantially equal to the pressure of the functional fluid in the first enclosure, within plus or minus 10%.

The spacer cavity and the first enclosure can be connected together by a conduit closed by a deformable or movable membrane, the membrane being capable of deforming or move towards the spacer cavity or the first enclosure in response to a difference between the pressure in the spacer cavity and the pressure in the first enclosure, the conduit and said membrane thus forming the pressure adjusting device.

Alternatively, the pressure adjusting device can include:
a first pressure sensor, located in the first enclosure;
a second pressure sensor, located in the spacer cavity; and
a control device, receiving as inputs, pressure measurements provided by the first and second pressure sensors, and configured to drive the pressure in the spacer cavity such that it is substantially equal to the pressure in the first enclosure.

According to a second embodiment:
the second fluid has an optical index substantially equal to that of the functional fluid, within plus or minus 10%; and
the pressure adjusting device is adapted for the pressure within the spacer cavity to be substantially equal to the pressure in the ambient medium, within plus or minus 10%.

The second fluid is advantageously of a same nature as the functional fluid.

The spacer cavity can be open to a column adapted to receive a variable amount of the second fluid, and itself open to the ambient medium, said column thus forming the pressure adjusting device.

According to either or both embodiments, the first enclosure can be laterally bordered by two inlet and/or outlet windows according to the invention.

According to an advantageous alternative, the element according to the invention comprises a series of juxtaposed enclosures, for receiving in circulation functional fluids of the same nature, and:
at least one of the end enclosures of said series is provided with an inlet and/or outlet window according to the invention, and forms a first enclosure according to the invention;
the enclosures are separated two by two by two respective spacer viewports which delimit together a separating region between two neighbouring enclosures; and
each separating region is for receiving a fluid of the same nature and at a same pressure as the second fluid in the spacer cavity of the at least one inlet and/or outlet window.

The at least one separating region, on the one hand, and the spacer cavity of the at least one end enclosure forming a first enclosure, on the other hand, form together a same housing having a pressure which is uniform in space.

The functional fluid can be a refrigerant for a solid amplifying medium.

Alternatively, the functional fluid can make up an amplifying medium.

The invention also relates to a laser amplification system, including an element according to the invention, and at least one light emitting source adapted to emit an optical pumping light beam, towards the first enclosure.

BRIEF DESCRIPTION OF THE DRAWINGS

The present invention will be better understood upon reading the description of exemplary embodiments given by way of purely indicating and in no way limiting purposes, making reference to the appended drawings in which.

DETAILED DISCLOSURE OF PARTICULAR EMBODIMENTS

In the description hereinafter, but in a non-limiting way, an element according to the invention for a laser amplification system is more particularly described.

Figure 1A:
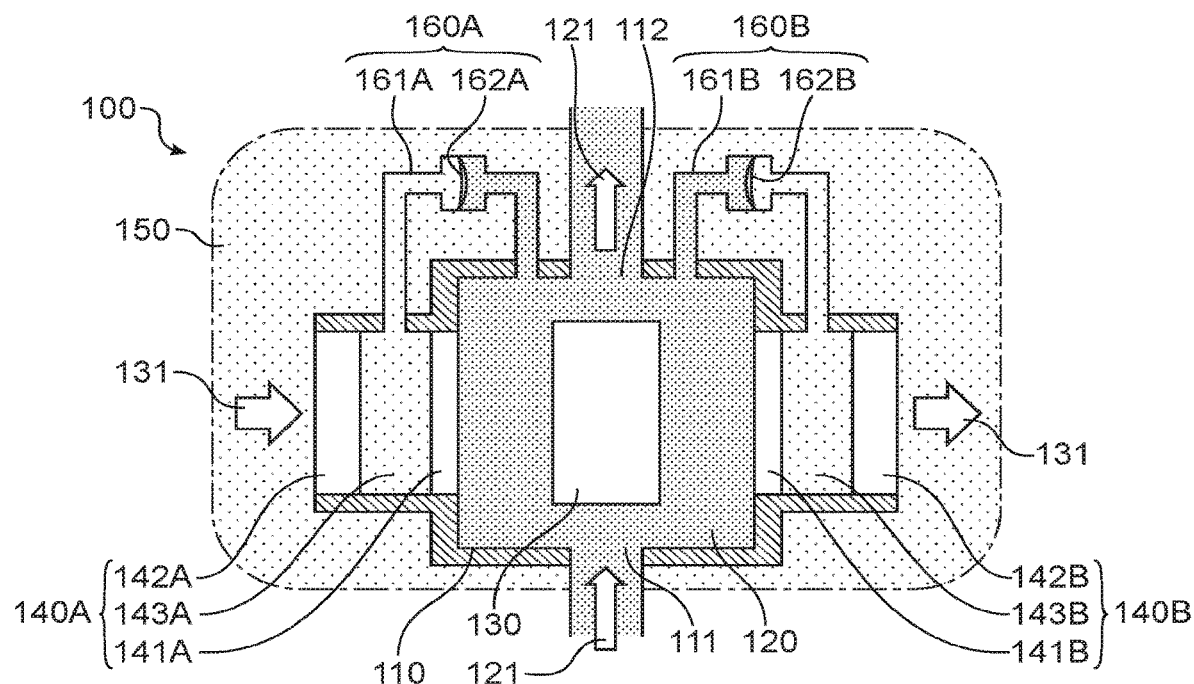
FIG. 1A schematically illustrates a first embodiment of an element according to the invention, for an optical system.
Figure 1B:
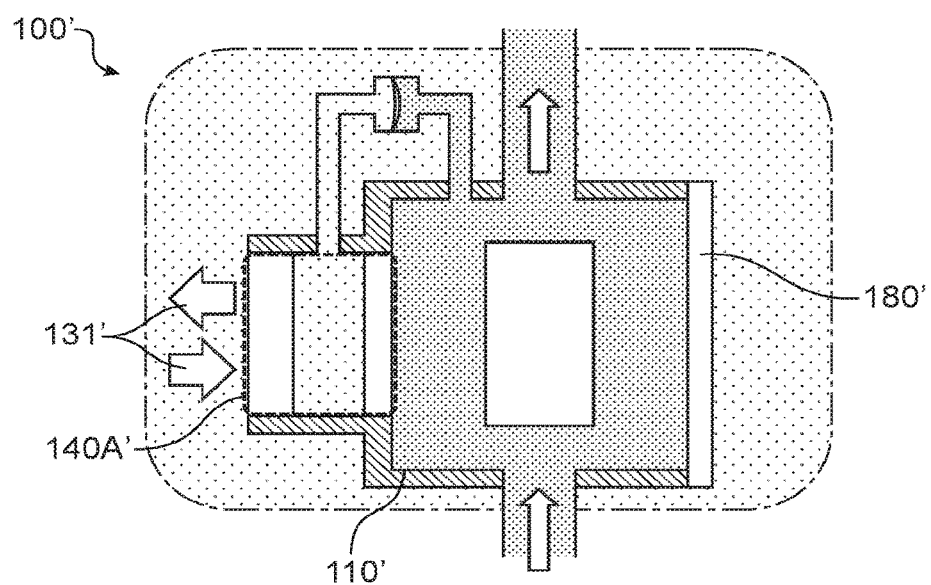
FIGS. 1B and 1C respectively illustrate two alternatives of the embodiment of FIG. 1A.

FIG. 1A schematically illustrates a first embodiment of an element 100 according to the invention, represented in operation.

The element 100 includes a first enclosure 110, receiving a functional fluid 120.

The first enclosure 110 also receives a solid amplifying medium 130, completely dipped in the functional fluid 120.

The solid amplifying medium 130 is for example a doped crystal, or doped ceramic, or doped glass, etc.

In operation, the functional fluid 120 flows in a fluid flow circuit, not represented, passing through the first enclosure 110. For this, the first enclosure 110 has an inlet opening 111 and an outlet opening 112, for enabling the functional fluid to pass into and out of the first enclosure respectively. The flow rate of functional fluid 120 in the first enclosure is for example between 1 m/s and 5 m/s. Vertical arrows 121 depict the flow of the functional fluid 120.

The functional fluid 120 can be a gas or a liquid, preferably a liquid. Here, the functional fluid 120 is more particularly a refrigerant, to cool the solid amplifying medium 130 when the latter is optically pumped by a pumping light beam (not represented in FIG. 1A).

When it is optically pumped, the solid amplifying medium 130 emits or amplifies a monochromatic light beam, called a laser signal and represented here by arrows 131.

The functional fluid 120 is transparent at the wavelength of this laser signal 131. In other words, it has a transmission coefficient greater than or equal to 80% at the wavelength of said laser signal, and more preferentially greater than or equal to 90%, 95% or even 99%.

The first enclosure 110 here comprises two inlet and/or outlet windows 140A, 140B, capable of allowing light rays to pass therethrough at the wavelength of the laser signal 131.

These inlet and/or outlet windows 140A, 140B each extend on opposite faces of the first enclosure 110.

The element 100 is immersed in an ambient medium 150.

When the element 100 is left in the open air, the ambient medium 150 is formed by air at atmospheric pressure. Alternatively, the element 100 extends in a casing under vacuum, the ambient medium 150 being then formed by vacuum (rarefied gas, at a pressure smaller than or equal to one hundredth of atmospheric pressure, and even smaller than or equal to one thousandth of the atmospheric pressure). According to another alternative, the element 100 extends in a casing filled with a fluid other than air. Anyway, the invention is not limited by the nature of the ambient medium 150.

The optical index of the ambient medium is referenced as $n_{ext}$, and its pressure as $P_{ext}$.

Similarly, the optical index of the functional fluid 120 is referenced as $n_F$ and its pressure in the first enclosure 110 as $P_F$.

According to the invention, each inlet and/or outlet window 140A, 140B includes two viewports:
- an inner viewport 141A, 141B, located on the side of the first enclosure 110; and
- an outer viewport 142A, 142B, located on the side opposite to the first enclosure 110.

Each inner respectively outer viewport 141A, 141B, 142A, 142B is transparent at the wavelength of the laser signal 131. In other words, it has a transmission coefficient greater than or equal to 80% at the wavelength of the laser signal 131, and more preferentially greater than or equal to 90%, 95% or even 99%.

Here, but in a non-limiting way, in each inlet and/or outlet window 140A (respectively 140B), the inner viewport and the outer viewport extend parallel to each other.

In each inlet and/or outlet window 140A (respectively 1401), the inner viewport 141A (respectively 141B) and the outer viewport 142A (respectively 142B) laterally delimit together a spacer cavity 143A (respectively 143B). The spacer cavity 143A (respectively 143B), in operation, is filled with a second fluid. It is further provided with a pressure adjusting device 160A (respectively 160B) therewithin.

The optical index of the second fluid is referenced as $n_C$ and its pressure in the spacer cavity 143A (respectively 143B) as $P_C$.

According to the first embodiment illustrated in FIG. 1A, the index $n_C$ and the pressure $P_C$ satisfy, in operation, the following:
- $n_C$ substantially equal to the optical index $n_{ext}$ of the ambient medium, within plus or minus 20%, and more preferentially within plus or minus 10% (in other words, $n_C$ is between $0.8*n_{ext}$ and $1.2*n_{ext}$, and more preferentially between $0.9*n_{ext}$ and $1.1*n_{ext}$, limits inclusive); and
- $P_C$ substantially equal to the pressure $P_F$ of the functional fluid 120 inside the first enclosure 110, within plus or minus 20%, and more preferentially within plus or minus 10% (in other words, $P_C$ is between $0.8*P_F$ and $1.2*P_F$, and more preferentially between $0.9*P_F$ and $1.1*P_F$, limits included).

In the following, an ideal case in which $n_C=n_{ext}$ and $P_C=P_F$ is considered.

Preferably, the second fluid then consists of a fluid of the same nature as the ambient medium 150.

Balancing the pressures $P_C=P_F$ is made by the pressure adjusting device-160A, respectively 160B.

In the example represented in FIG. 1A, the pressure adjusting device 160A (respectively 160B) is configured to perform pressure balancing simply by an adapted mechanical arrangement.

Each pressure adjusting device 160A (respectively 160B), includes a conduit 161A (respectively 161B) connecting the first enclosure 110 and the corresponding spacer cavity 143A (respectively 143B). On the side of the first enclosure 110, the conduit 161A (respectively 161B) is filled, in operation, with the functional fluid 120. On the side of the spacer cavity 143A (respectively 143B), the conduit 161A (respectively 161B) is filled, in operation, with the second fluid.

Inside each conduit 161A (respectively 161B) a deformable membrane 162A (respectively 162B) extends. The deformable membrane 162A (respectively 162B) is a sealed membrane attached on its entire periphery to an inner perimeter of the conduit 161A (respectively 161B). It enables a zone of the conduit, located on the side of the first enclosure 110 and intended for receiving the functional fluid 120, to be sealingly separated relative to a zone of the conduit located on the side of the corresponding spacer cavity and intended for receiving the second fluid. Here, preferably, the conduit 161A (respectively 161B) includes a region with a large diameter, between two regions with a reduced diameter, the deformable membrane 162A (respectively 162B) being located in the region with a large diameter.

In operation, the deformable membrane 162A (respectively 162B) is curved towards the first enclosure or towards the corresponding spacer cavity, depending on a pressure difference between the latter. The deformation of the deformable membrane 162A (respectively 162B) modifies volumes respectively affected to the functional fluid and to the second fluid, which enables pressures to be equalised in the first enclosure and in the spacer cavity.

In particular, when the flow rate of operating fluid increases, the pressure thereof in the first enclosure also increases. The functional fluid then exerts a more significant pressure force on the deformable membrane 162A (respectively 162B). It deforms, such that the volume available for the functional fluid increases, and the volume available for the second fluid decreases. Thus, the pressure in the first enclosure decreases and the pressure in the spacer cavity increases.

Symmetrically, when the flow rate of functional fluid decreases, the membrane deforms, such that the pressure in the first enclosure increases and the pressure in the spacer cavity decreases.

The deformation of the deformable membrane 162A (respectively 162B) thus allows balancing in real time between pressure in the first enclosure and pressure in the spacer cavity, so as to obtain and keep the condition $P_C=P_F$.

In operation, the laser signal 131 passes at least once through each inlet and/or outlet window 140A (respectively 140B). Preferably, it passes only once through each inlet and/or outlet window 140A (respectively 140B). Alternatively, it can travel back and forth between the mirrors of a resonant optical cavity, and then pass several times through each inlet and/or outlet window 140A (respectively 140B).

When the laser signal 131 passes through the inlet and/or outlet window 140A (respectively 140B), it successively passes, in one order or the other, through the outer viewport 142A (respectively 142B) and the inner viewport 141A (respectively 141B).

The outer viewport 142A (respectively 142B) separates the ambient medium and the medium in the spacer cavity 143A (respectively 143B). Therefore, it separates here two media at different pressures, the ambient medium having for example a low pressure $P_{ext}$, and the medium in the spacer cavity having for example a high pressure $P_C=P_F$. The outer viewport 142A (respectively 142B) is thus mechanically deformed by the pressure difference between both media. However these media have a same optical index $n_{ext}$. Consequently, the mechanical deformation of the outer viewport 142A (respectively 142B) results in a low beam quality degradation of the laser signal 131.

The inner viewport 141A (respectively 141B) separates the medium in the spacer cavity 143A (respectively 143B) and the medium in the first enclosure. Therefore, it separates here two media having different optical indices, $n_C=n_{ext}$ respectively $n_F$. A mechanical deformation of the inner viewport 141A (respectively 141B) would thus result in a strong beam quality degradation of the laser signal 131. However, both media on either side of the inner viewport have the same pressure $P_C=P_F$. Consequently, the inner viewport 141A (respectively 141B) is not or only slightly mechanically deformed, which results in a low beam quality degradation of the laser signal 131.

In total, successively passing through the inner viewport 141A (respectively 141B) and the outer viewport 142A (respectively 142B) generates, on the laser signal 131, a lesser wave front deformation in comparison with the wave front deformation brought about, in prior art, by a single viewport. Therefore, the invention enables a wave front deformation to be reduced on the laser signal 131.

The case in which $n_C=n_{ext}$ and $P_C=P_F$ has been illustrated above. An improvement relative to prior art can however be achieved, apart from this ideal case, and within a range of values as described above.

In order to limit a beam quality degradation, related to passing through the inlet and/or outlet window, a very simple solution would consist in relieving mechanical stresses on assembling a single viewport, so as to limit its mechanical deformation, in operation. Such a solution could however result in sealing defects at the viewport. On the contrary, according to the invention, sealing the inlet and/or outlet window is ensured.

According to an alternative not represented, the deformable membrane is replaced by a movable membrane, or moving piston, capable of translationally moving in the conduit as a function of a difference between the pressure in the first enclosure and the pressure in the corresponding spacer cavity.

According to another alternative, 100', illustrated in FIG. 11, the first enclosure 110' comprises a single inlet and/or outlet window 140A' as described above. In this case, a mirror 180', reflecting at the wavelength of the laser signal 131', extends inside the first enclosure 110', on the side opposite to the inlet and/or outlet window 140A'.

Figure 1C:
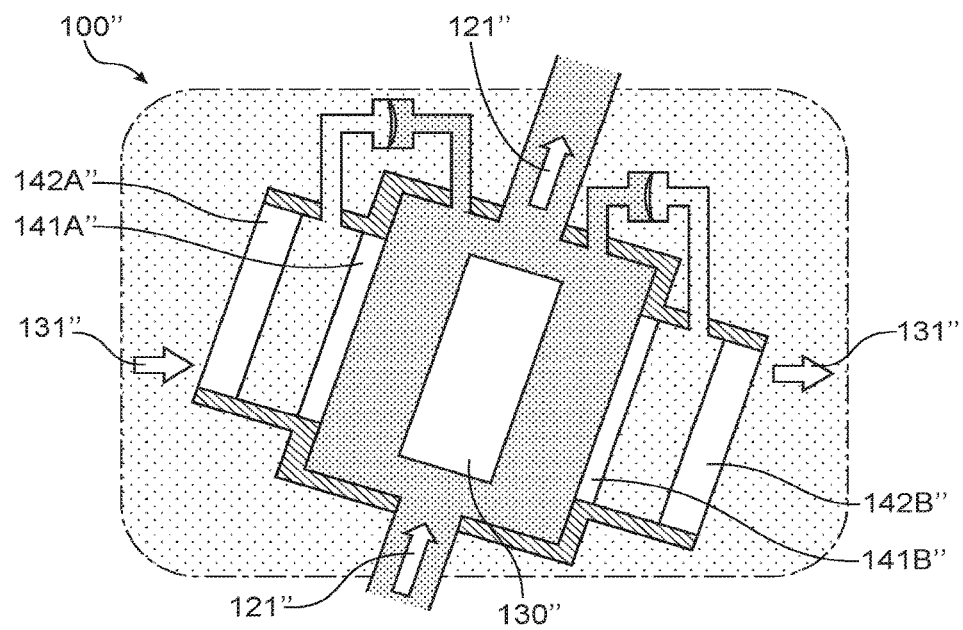

According to another alternative, 100", illustrated in FIG. 1C, the element 100" is arranged such that the laser signal 131" arrives on the inner and outer viewports, 141A", 142A", 141B", 142B", with an incidence different from the normal incidence. In particular, the element 100" can be arranged such that the laser signal 131" arrives on the inner and outer viewports, 141A", 142A", 141B", 142B", with an incidence close to the Brewster angle incidence, for which there is no reflection loss. Such an arrangement can enable an anti-reflection treatment on the viewports to be dispensed with. The value of the Brewster angle incidence actually relates to a single interface, and depends on optical indices of media on each side of the interface. Consequently, all the viewports 141A", 142A", 141B", 142B" are not associated with a same value of the Brewster angle incidence. The incidence of the laser signal 131" on the latter is thus a compromise, enabling the whole reflection losses to be minimised upon passing therethrough.

Figure 2:
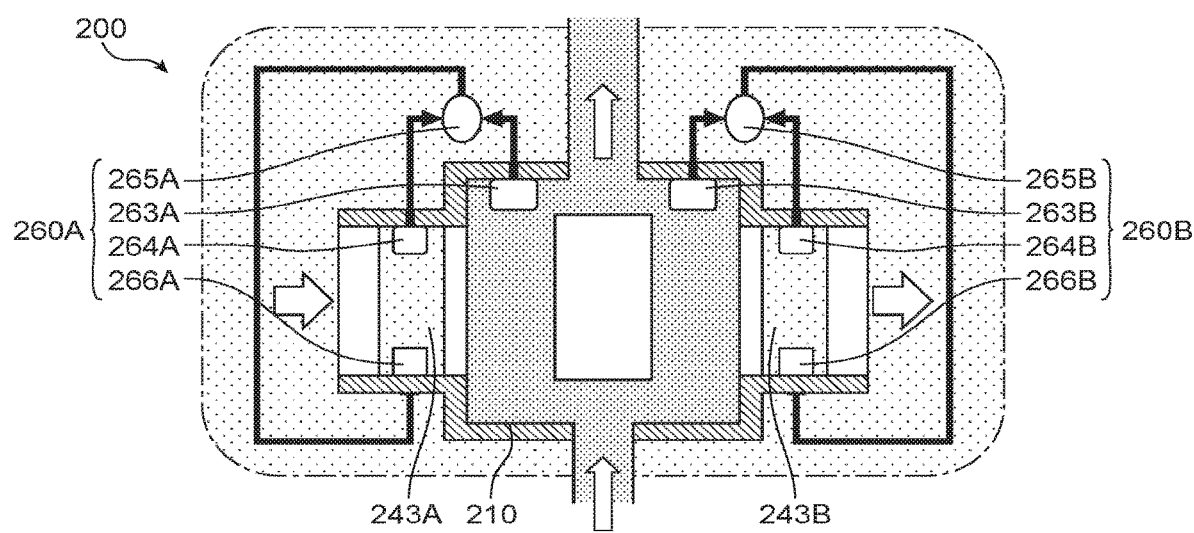
FIGS. 2 and 3 respectively illustrate two other alternatives of the embodiment of FIG. 1A.

FIG. 2 illustrates an alternative 200 of the element according to the invention, which only differs from the embodiment of FIG. 1A in that each pressure adjusting device 260A (respectively 260B) includes a control system comprising:

- a pressure sensor 263A (respectively 263B), located in the first enclosure 210;
- a pressure sensor 264A (respectively 264B), located in the corresponding spacer cavity 243A (respectively 243B);
- a calculator 265A (respectively 265B), receiving as inputs measurements provided by both pressure sensors 263A, 264A (respectively 263B, 264B) and generating as an output a pressure set point; and
- a pressure driving element 266A (respectively 266B) located in the corresponding spacer cavity 243A (respectively 243B), receiving as an input the pressure set point and responsively modifying the pressure in said spacer cavity.

The calculator 265A (respectively 265B) is configured to compare pressure measurements provided by the sensor 263A and the sensor 264A (respectively 263B and 264B)

respectively, and to responsively generate a pressure set point adapted to equalise measurements provided by both sensors.

Said set point is received by the pressure driving element 266A (respectively 266B), capable of modifying pressure in the corresponding spacer cavity 243A (respectively 243B) in response to the set point received. In FIG. 2, the pressure driving element 266A (respectively 266B) is very schematically represented. In practice, it can comprise a conduit, in fluid communication with the corresponding spacer cavity, and closed by a moving piston the position in the conduit of which modifies pressure in the spacer cavity. Many solutions to drive a pressure value in a closed environment can also be implemented, without departing from the scope of the invention.

Each pressure adjusting device 260A (respectively 260B) here includes a respective sensor located in the first enclosure 210. Alternatively, they can share a same pressure sensor located in the first enclosure 210.

Figure 3:
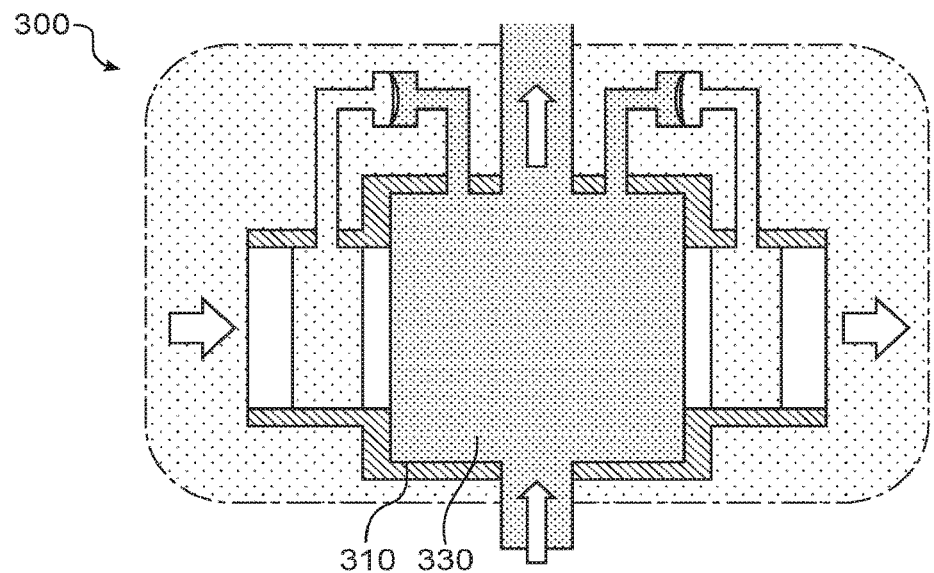

FIG. 3 illustrates an alternative 300 of the element according to the invention, which only differs from the embodiment of FIG. 1A in that the functional fluid 320 is an optical amplification fluid, forming the amplifying medium of a "dye laser" type laser amplification system. Such a fluid generally includes organic molecules diluted in a solvent. In this alternative, there is no solid amplifying medium inside the first enclosure 310, in operation.

Figure 4:
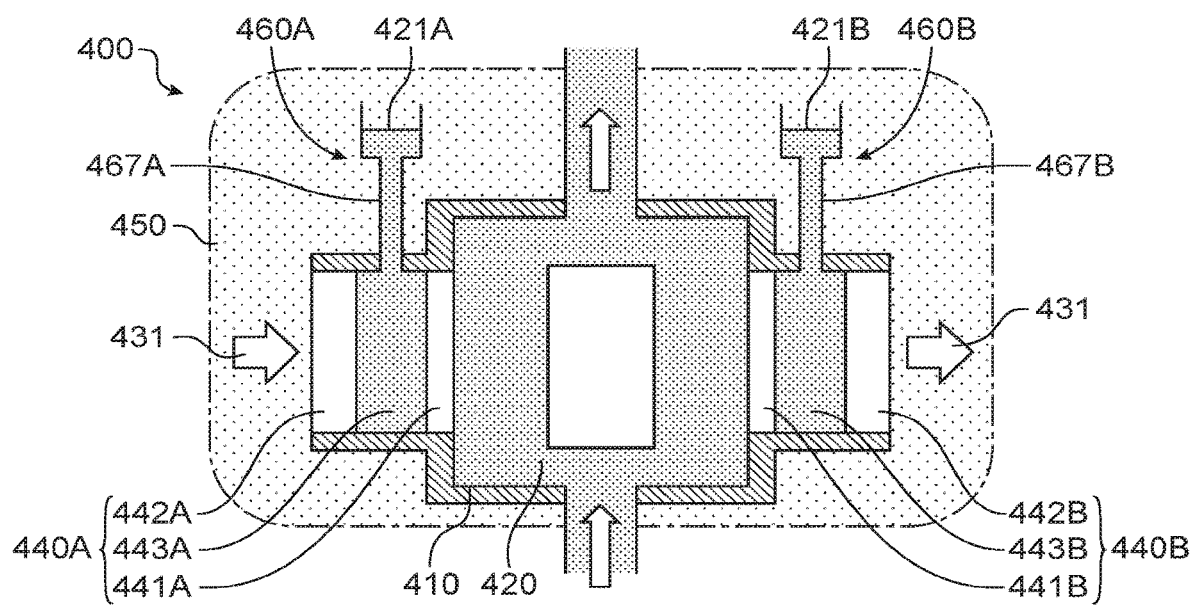
FIG. 4 schematically illustrates a second embodiment of an element according to the invention, for an optical system.

FIG. 4 schematically illustrates a second embodiment 400 of an element according to the invention.

According to this embodiment, the index $n_C$ and pressure $P_C$ of the medium in the spacer cavities 443A, 443B satisfy, in operation, the following:

$n_C$ substantially equal to the optical index $n_F$ of the functional fluid 420, within plus or minus 20%, and more preferentially within plus or minus 10% (in other words, $n_C$ is between $0.8*n_F$ and $1.2*n_F$, and more preferentially between $0.9*n_F$ and $1.1*n_F$, limits included); and $P_C$ substantially equal to the pressure $P_{ext}$ of the ambient medium 450, within plus or minus 20%, and more preferentially within plus or minus 10% (in other words, $P_C$ is between $0.8*P_{ext}$ and $1.2*P_{ext}$, and more preferentially between $0.9*P_{ext}$ and $1.1*)P_{ext}$, limits included).

In the following, an ideal case in which there are $n_C=n_F$ and $P_C=P_{ext}$ is considered.

Preferably, the second fluid then consists of a fluid of a same nature as the functional fluid 420.

Balancing the pressures $P_C=P_{ext}$ is performed by the pressure adjusting device 460A, respectively 460B. In the example represented in FIG. 4, the pressure adjusting device 460A (respectively 460B) is configured to simply perform pressure balancing by an adapted mechanical arrangement.

Each pressure adjusting device 460A (respectively 460B), includes a column 467A (respectively 467B), in fluid communication with the corresponding spacer cavity 443A (respectively 443B).

The column 467A (respectively 467B) extends along an axis parallel to the axis of gravity, or tilted relative to this axis by an angle preferentially smaller than or equal to 45°.

The column 467A (respectively 467B) is open onto the ambient medium 450, on the side opposite to the spacer cavity 443A (respectively 443B). In operation, the column 467A (respectively 467B) is filled with the second fluid, on the side of the spacer cavity 443A (respectively 443B), and with the fluid or vacuum of the ambient medium, on the side of the ambient medium 450.

Here, preferably, the column 467A (respectively 467B) includes a region with a large diameter, separated from the spacer cavity 443A (respectively 443B) by a region with a reduced diameter. An interface 421A (respectively 421B), in the column, between the second fluid and the fluid or vacuum of the ambient medium, is advantageously located in this region having a large diameter.

In operation, the interface 421A (respectively 421B) is naturally situated at the position achieving a pressure match between the pressure in the ambient medium 450, and the pressure of the second fluid in the spacer cavity 443A (respectively 443B). If one of both pressures is modified, especially the pressure in the ambient medium, the interface 421A (respectively 421B) moves along the axis of gravity, so as to get back to the condition $P_C=P_{ext}$.

The column 467A (respectively 467B), open onto the ambient medium 450, thus allows balancing in real time between the pressure in the ambient medium and the pressure in the spacer cavity, to obtain and keep the condition $P_C=P_{ext}$.

In operation, the laser signal 431 generated in the first enclosure 410 passes at least once through the at least one inlet and/or outlet window 440A, 440B.

When the laser signal 431 passes through the inlet and/or outlet window 440A (respectively 440B), it successively passes, in one order or the other, through the outer viewport 442A (respectively 442B) and the inner viewport 441A (respectively 441B).

The outer viewport 442A (respectively 442B) separates the ambient medium and the medium in the spacer cavity 443A (respectively 443B). Therefore, it separates here two media with different optical indices, $n_{ext}$ respectively $n_C=n_F$. A mechanical deformation of the outer viewport 442A (respectively 442B) would result in a strong beam quality degradation of the laser signal 431. However, both media on either side of the outer viewport have the same pressure $P_C=P_{ext}$, such that the outer viewport 442A (respectively 442B) is not or only slightly deformed. Consequently, passing through the outer viewport 442A (respectively 442B) results in a low beam quality degradation of the laser signal 431.

The inner viewport 441A (respectively 441B) separates the medium in the spacer cavity 443A (respectively 443B) and the medium in the first enclosure. Therefore, it separates here two media at different pressures, the medium in the spacer cavity having for example a low pressure $P_C=P_{ext}$, and the medium in the first enclosure having for example a high pressure $P_F$. The inner viewport 441A (respectively 441B) is thus mechanically deformed by the pressure difference between both media. However, both media have here a same optical index $n_F$ here. Consequently, the mechanical deformation of the inner viewport 441A (respectively 441B) results in a low beam quality degradation of the laser signal 431.

In total, successively passing through the inner viewport 441A (respectively 441B) and the outer viewport 442A (respectively 442B) generates, on the laser signal 431, a lesser wave front deformation in comparison with the wave front deformation brought about, in prior art, by a single viewport.

The case in which $n_C=n_F$ and $P_C=P_{ext}$ has been illustrated above. An improvement relative to prior art can however be achieved, apart from this ideal case, and within a range of values as described above.

It is actually, in the first and second embodiments illustrated in FIGS. 1A and 1n FIG. 4 respectively, a same idea which consists in splitting a pressure and optical index surge together, into a pressure surge and optical index surge separately. In both cases, a single viewport is replaced by a pair of two viewports delimiting a spacer cavity in which the optical index and the pressure can be controlled.

The alternatives of the first embodiment, illustrated especially in FIGS. 1A, 1B, 2 and 3, can be adapted to the embodiment of FIG. 4. In particular, the pressure adjustment can implement a control system by pressure measurements. Likewise, the functional fluid can be an optical amplification fluid.

Further, a same enclosure can be closed by two inlet and/or outlet windows, each according to a different embodiment among the first and the second embodiments according to the invention.

In each of the embodiments of the invention, the inner and outer viewports can each consist of a plate with parallel sides.

Alternatively, the at least one of said viewports has, at rest, a space-variable thickness, adapted to limit optical aberrations of the inlet and/or outlet window, in operation. The shape of the viewport at rest, designates its shape in the absence of mechanical stresses related to a pressure difference between both media it separates. A static correction, enabling a main component of the optical aberrations to be dispensed with, is then combined with an adaptive component, enabling a residual component of the optical aberrations to be dispensed with. The main component can be associated with a predetermined value of the flow rate of the functional fluid. The residual component then relates to a deviation between the current value and said predetermined value of the flow rate of functional fluid. The correction of optical aberrations can thus be adapted in real time, as a function of a variation in the flow rate of the functional fluid in the first enclosure. This variation in flow rate can be related to a variation in a cooling need, for example when a laser pulse generation rate is increased. The variation in flow rate can also depend on other factors such as ageing of the pumping system of the functional fluid. The adaptation in real time of the aberration correction is carried out by adjusting the pressure in the spacer cavity in real time, by means of the pressure adjusting device.

It is noticed that the beam quality of a high intensity light beam passing through an inlet and/or outlet window can be degraded by a cumulative thickness of the inner and outer viewports which is too large. But, the invention makes it possible to resort to a reduced thickness of the inner viewport, which enables this cumulative thickness to be limited. In particular, doubling the number of viewports does not double the cumulative thickness of the viewports, contrary to popular opinion from those skilled in the art.

In the first embodiment, the inner viewport separates two media substantially at the same pressure. It is thus subjected to restricted mechanical forces, such that it can have a reduced thickness.

In the second embodiment, the inner viewport separates two media at different pressures, such that it is subjected to strong mechanical forces. Since both media have substantially the same optical index, the mechanical deformation of the inner viewport has little impact on the optical quality of the beam passing through it. A larger mechanical deformation of the inner viewport, and thus a lower thickness thereof can therefore be tolerated.

The ratio of the thickness to the diameter of the inner viewport is for example smaller than or equal to 1/25, and even smaller than or equal to 1/50.

The ratio of the thickness of the inner viewport to the thickness of the outer viewport is for example smaller than or equal to 0.5 or even smaller than or equal to 0.3 or even 0.2.

When the inner or outer viewport is not a plate with parallel sides, its thickness is a mean thickness on its entire surface.

Figure 5:
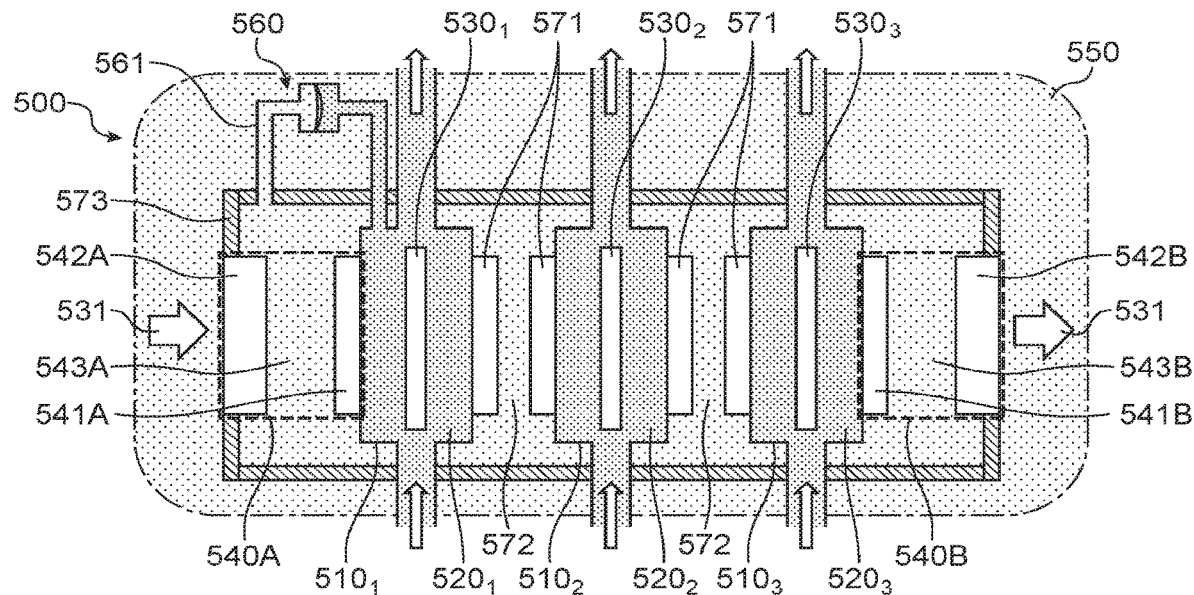
FIG. 5 schematically illustrates, another alternative of the embodiment of FIG. 1A, with several juxtaposed enclosures.

FIG. 5 illustrates an alternative 500 of the embodiment of FIG. 1A, including a plurality of enclosures $510_1$, $510_2$, $510_3$ each receiving a flowing functional fluid $520_1$, $520_2$, $520_3$.

Each enclosure $510_1$, $510_2$, $510_3$ also receives a so-called elementary solid amplifier $530_1$, $530_2$, $530_3$. Each functional fluid $520_1$, $520_2$, $520_3$ is a refrigerant, capable of cooling one of the elementary amplifying media. This arrangement enables an efficient cooling to be combined with advantages of a thick amplifying medium. The arrangement of each elementary amplifying medium in a dedicated enclosure further enables a cumulative thickness of the functional fluid to be limited, and thus a beam degradation related to the presence of the functional fluid (beam degradation especially related to the absorption in the laser emission spectrum and to thermo-hydraulic effects of the functional fluid) to be limited.

The enclosures $510_1$, $510_2$, $510_3$ all have the same dimensions, and are each adapted to receive a fluid of the same nature. It is thus considered that they all have, in operation, a same internal pressure. If need be, the element 500 according to the invention can comprise a pressure driving device in the enclosures, to ensure that they all have a same internal pressure.

The enclosures $510_1$, $510_2$, $510_3$ are arranged in parallel, juxtaposed after and next to each other, here between two inlet and/or outlet windows 540A, 540B according to the invention. Both end enclosures, here $510_1$ and $510_3$, are thus each provided with such an inlet and/or outlet window 540A, 540B. They each form a first enclosure according to the invention.

The enclosures $510_1$, $510_2$, $510_2$ are separated two by two by a first spacer viewport 571, closing the one enclosure, a second spacer viewport 571, closing the other enclosure, and a separating region 572, between both viewports.

The spacer viewports 571 are each transparent at the wavelength of the laser signal 531. In other words, each of these viewports has a transmission coefficient greater than or equal to 80% at the wavelength of said laser signal, and more preferentially greater than or equal to 90%, 95% or even 99%.

Each separating region 572 is for receiving a fluid having substantially the same optical index and substantially the same pressure as the second fluid in the spacer cavity 543A, respectively 543B of one of the inlet and/or outlet windows 540A, 540B.

Here, each separating region 572 receives a fluid having substantially the same optical index as the fluid of the ambient medium, and substantially at the same pressure as the functional fluid in either of the enclosures $510_1$, $510_2$, $510_3$.

Each spacer viewport 571 thus separates two media with different optical indices, but at a same pressure. Each spacer viewport 571 thus has a negligible mechanical deformation, such that it barely degrades beam quality of the laser signal 531 passing through the element 500.

An optical amplification is thus achieved using several elementary solid amplifying media, by limiting a cumulative thickness of functional fluid and by limiting beam degradation related to the multiplication of optical interfaces.

Advantageously, and as illustrated in FIG. 5, the spacer cavities 543A, 543B and separating regions 572 are arranged together so as to allow a circulation of a fluid. The different enclosures $510_1$, $510_2$, $510_3$ are then located inside a same housing 573. Thus, by construction, both spacer cavities 543A, 543B and the separating regions 572 all have a same pressure and are adapted to receive the same fluid.

The housing 573 is provided, on its two opposite faces, with respective outer viewports 542A, 542B of both inlet and/or outlet windows 540A, 540B. Inside the housing 573, the different enclosures extend, each provided with two viewports (two spacer viewports 571, for the central enclosures, or a spacer viewport and an inner viewport 541A, 541B, for the end enclosures).

In the example represented in FIG. 5, the housing 573 receives a fluid of the same nature as the fluid in the ambient medium 550, and at a same pressure as the functional fluid in each of the enclosures $510_1$, $510_2$, $510_3$.

The housing 573 is here provided with a pressure adjusting device 560, as described with reference to FIG. 1A, comprising a conduit 561 connecting one of the enclosures $510_1$, $510_2$, $510_3$ and the inside of the housing 573.

Different alternatives can be implemented without departing from the scope of the invention, for example with a pressure adjusting device as described with reference to FIG. 2, or with partitioned separating regions each provided with their own pressure adjusting device, etc.

According to other alternatives, each separating region receives a fluid having substantially the same optical index as the functional fluid, and substantially at the same pressure as the fluid or vacuum of the ambient medium.

In this case, each spacer viewport separates two media at different pressures, but having a same optical index. Each spacer viewport thus has a mechanical deformation, but which hardly degrades beam quality of the laser signal passing through the element according to the invention.

Once again, different alternatives can be implemented, for example with a housing receiving the several enclosures and provided with a single pressure adjusting device (for example as described with reference to FIG. 4), or with partitioned separating regions each provided with their own pressure adjusting device.

Figure 6:
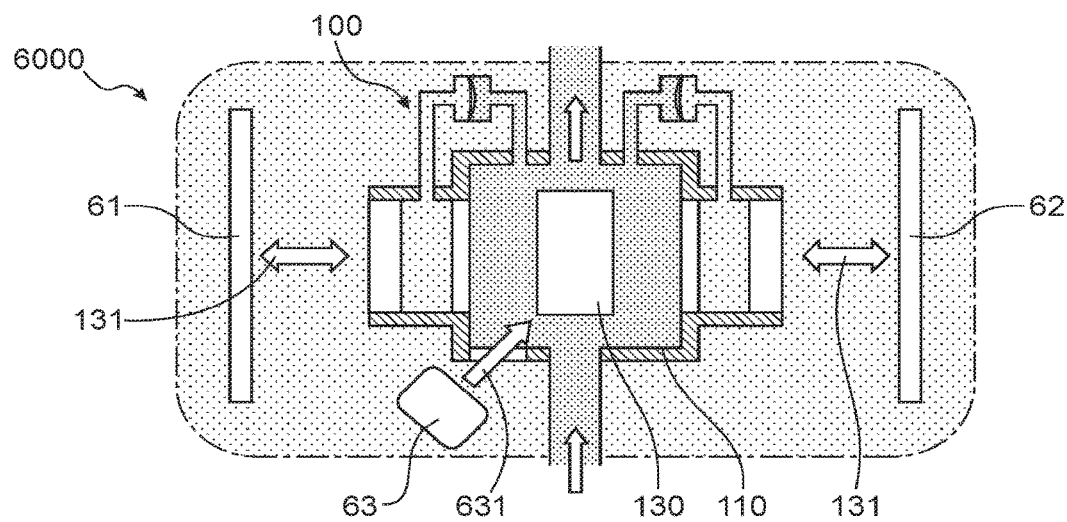
FIG. 6 schematically illustrates a laser amplification system according to the invention.

FIG. 6 represents a laser amplification system 6000 including an element 100 as described with reference to FIG. 1A.

The element 100 is here disposed between two mirrors 61, 62, reflecting at the wavelength of the laser signal 131. The mirrors 61, 62 form together an optically resonant cavity, to multiply a number of passages through the amplifying medium 130.

The laser amplification system 6000 further includes, at least one light source 63, adapted to emit a light beam 631 referred to as a pumping beam. The pumping beam 631 provides the amplifying medium 130 with the energy necessary to generate the laser signal 131.

The light source 63 extends outside the first enclosure 110. For the pumping beam 631 to be able to pass into the first enclosure 110, the latter is provided with an inlet window 64. Although not represented in FIGS. 1 to 5, this inlet window is advantageously present in all the embodiments of an element according to the invention for a laser amplification system. The optical quality of the pumping beam 631 is not critical for the proper operation of the laser amplification system 6000. The inlet window 64 can thus consist of a single viewport, transparent at the wavelength of the pumping beam 631.

Alternatively, the laser amplification system according to the invention includes the light source adapted to emit a pumping beam, and the element according to the invention is not disposed inside an optically resonant cavity. In this case, the laser signal is not generated in the first enclosure, but simply amplified upon passing through the first enclosure. The pumping beam then provides the amplifying medium with the energy necessary to amplify the laser signal.

Many alternatives of a laser amplification system according to the invention can be implemented, including either of the embodiments and alternatives of an element according to the invention, including an optically resonant cavity, or not, including one or more light sources emitting a pumping beam, etc.

The invention is particularly advantageous in the field of liquid-cooled laser amplifiers. Nonetheless, it is also applicable to other fields, in particular in fields where it can be advantageous to cool an optical energy-absorbing element using a refrigerant. The element absorbing optical energy can comprise a frequency converting crystal, or a birefringent crystal as implemented in a Pockels cell. Cooling with a refrigerant can be advantageous especially when the optical energy-absorbing element receives a light beam as a high intensity pulsed signal. The invention is also applicable to the field of dye lasers.

The invention provides dynamic wave surface correction, by virtue of the possibility of adjusting pressure in real time in the spacer cavity of the inlet and/or outlet window. It also provides a highly simple implementation and a restricted overall size, by dispensing with external devices such as phase conjugation mirrors.

The invention claimed is:

1. An element of an optical system including:
    a first enclosure for receiving in circulation a functional fluid; and
    at least one inlet and/or outlet window fixedly located on the first enclosure, and configured to allow a light beam to pass into and/or out of the first enclosure;
    wherein:
    the inlet and/or outlet window includes two viewports which laterally delimit a spacer cavity adjacent to the first enclosure, said spacer cavity is configured for receiving a second fluid, having a predetermined optical index, and is provided with a pressure adjusting device therewithin,
    the second fluid has an optical index substantially equal to that of one of the functional fluid and an ambient medium surrounding said element, within plus or minus 10%, and
    the pressure adjusting device is adapted for the pressure within the spacer cavity to be substantially equal to a pressure of the other of the functional fluid in the first enclosure and the ambient medium, within plus or minus 10%.

2. The element according to claim 1, wherein a mean thickness of the viewport located on a side of the first enclosure is smaller than a mean thickness of the viewport located on a side opposite to the first enclosure.

3. The element according to claim 1, wherein:
    the second fluid has an optical index substantially equal to that of the ambient medium, within plus or minus 10%; and
    the pressure adjusting device is adapted for the pressure within the spacer cavity to be substantially equal to the pressure of the functional fluid in the first enclosure, within plus or minus 10%.

4. The element according to claim 3, wherein the spacer cavity and the first enclosure are connected together by a conduit closed by a deformable or movable membrane, the membrane being configured to deform or move towards the spacer cavity or the first enclosure in response to a difference between the pressure in the spacer cavity and the pressure in the first enclosure, the conduit and said membrane thus forming the pressure adjusting device.

5. The element according to claim 3, wherein the pressure adjusting device includes:
a first pressure sensor located in the first enclosure;
a second pressure sensor located in the spacer cavity; and
a control device receiving as inputs pressure measurements provided by the first and second pressure sensors, and configured to drive pressure in the spacer cavity such that it is substantially equal to the pressure in the first enclosure.

6. The element according to claim 1, wherein:
the second fluid has an optical index substantially equal to that of the functional fluid, within plus or minus 10%; and
the pressure adjusting device is adapted for the pressure within the spacer cavity to be substantially equal to the pressure in the ambient medium, within plus or minus 10%.

7. The element according to claim 6, wherein the second fluid is of the same nature as the functional fluid.

8. The element according to claim 6, wherein the spacer cavity is open onto a column adapted to receive a variable amount of the second fluid and is open onto the ambient medium, said column thus forming the pressure adjusting device.

9. The element according to claim 1, wherein
the first enclosure is laterally bordered by two inlet and/or outlet windows, each of the two inlet and/or outlet windows being located on the first enclosure and configured to allow a light beam to pass into and/or out of the first enclosure, and each of the two inlet and/or outlet windows including two respective viewports which laterally delimit a respective spacer cavity adjacent to the first enclosure, each spacer cavity being configured to receive said second fluid, and being provided with a pressure adjusting device therewithin,
the second fluid has an optical index substantially equal to that of one of the functional fluid and an ambient medium surrounding said element, within plus or minus 10%, and
each of said pressure adjusting devices is adapted for the pressure within the corresponding spacer cavity to be substantially equal to the pressure of the other of the functional fluid in the first enclosure and the ambient medium, within plus or minus 10%.

10. The element according to claim 1, wherein the functional fluid is a refrigerant for a solid amplifying medium.

11. The element according to claim 1, wherein the functional fluid makes up an amplifying medium.

12. A laser amplification system, including an element according to claim 1, and at least one light emitting source configured to emit an optical pumping light beam towards the first enclosure.

13. An optical system comprising a plurality of enclosures arranged in a juxtaposed series for receiving in circulation one functional fluids or functional fluids of the same nature, wherein:
at least one of end enclosures of the series comprises the first enclosure according to claim 1;
the enclosures are separated two by two by two respective spacer viewports which delimit together a separating region between two neighboring enclosures; and
each separating region is configured to receive a fluid of the same nature and at a same pressure as the second fluid in the spacer cavity of the at least one of the end enclosures of the series.

14. The element according to claim 13, wherein the at least one separating region and the spacer cavity of the at least one end enclosure forming a first enclosure together form a same housing having a pressure which is uniform in space.

15. An element of an optical system including:
a first enclosure for receiving in circulation a functional fluid; and
an inlet window and an outlet window located on the first enclosure, the inlet window configured to allow a light beam to pass into the first enclosure and the outlet window configured to allow a light beam to pass out of the enclosure;
wherein:
each of the inlet window and the outlet window includes two viewports which laterally delimit a spacer cavity adjacent to the first enclosure,
the spacer cavity is configured to receive a second fluid, having a predetermined optical index, and is provided with a pressure adjusting device therewithin,
the second fluid has an optical index substantially equal to that of one of the functional fluid and an ambient medium surrounding the element, within plus or minus 10%, and
the pressure adjusting device is adapted for the pressure within the spacer cavity to be substantially equal to a pressure of the other of the functional fluid in the first enclosure and the ambient medium, within plus or minus 10%.

16. The element according to claim 15, wherein the functional fluid is a refrigerant for a solid amplifying medium.

17. An element of an optical system including:
a first enclosure for receiving in circulation a functional fluid;
an inlet window and an outlet window located on the first enclosure,
wherein:
each of the inlet window and the outlet window includes two viewports which laterally delimit a spacer cavity adjacent to the first enclosure,
the spacer cavity is configured to receive a second fluid, having a predetermined optical index, and is provided with a pressure adjusting device therewithin,
the second fluid has an optical index substantially equal to that of one of the functional fluid and an ambient medium surrounding the element, within plus or minus 10%, and
the pressure adjusting device is adapted for the pressure within the spacer cavity to be substantially equal to a pressure of the other of the functional fluid in the first enclosure and the ambient medium, within plus or minus 10%, and
a light injection port arranged in the spacer cavity separate from each of the inlet window and outlet window, wherein the inlet window and the outlet window are configured to allow a light beam injected into the spacer cavity through the light injection port to pass out of the enclosure.

18. The element according to claim 17, wherein the functional fluid is a refrigerant for a solid amplifying medium.

* * * * *